United States Patent
Van Der Veer et al.

(10) Patent No.: US 10,544,377 B2
(45) Date of Patent: *Jan. 28, 2020

(54) ODORIZED METHANE FLUID AND PROCESSES FOR PRODUCING ODORIZED METHANE FLUIDS AND THE USE THEREOF

(71) Applicant: SHELL OIL COMPANY, Houston, TX (US)

(72) Inventors: Wouter Martinus Van Der Veer, Rijswijk (NL); Stuart Meredith Macdonald, Amsterdam (NL)

(73) Assignee: SHELL OIL COMPANY, Houston, TX (US)

(*) Notice: Subject to any disclaimer, the term of this patent is extended or adjusted under 35 U.S.C. 154(b) by 98 days.

This patent is subject to a terminal disclaimer.

(21) Appl. No.: 15/769,939

(22) PCT Filed: Oct. 20, 2016

(86) PCT No.: PCT/EP2016/075189
§ 371 (c)(1),
(2) Date: Apr. 20, 2018

(87) PCT Pub. No.: WO2017/072015
PCT Pub. Date: May 4, 2017

(65) Prior Publication Data
US 2018/0305630 A1    Oct. 25, 2018

(30) Foreign Application Priority Data
Oct. 26, 2015    (EP) ..................................... 15191521

(51) Int. Cl.
*C10L 3/00*    (2006.01)
*C10L 3/06*    (2006.01)

(52) U.S. Cl.
CPC .................. *C10L 3/006* (2013.01); *C10L 3/06* (2013.01); *C10L 2230/10* (2013.01)

(58) Field of Classification Search
CPC combination set(s) only.
See application file for complete search history.

(56) References Cited

U.S. PATENT DOCUMENTS

| 1,429,982 A * | 9/1922 | Mazelli | F16D 1/04 403/276 |
|---|---|---|---|
| 3,761,232 A | 9/1973 | Klass et al. | |
| 4,025,315 A | 5/1977 | Mazelli | |
| 4,487,613 A * | 12/1984 | Yoshida | C10L 3/006 116/214 |
| 2004/0031314 A1* | 2/2004 | Flynn | C01B 3/00 73/40.7 |
| 2004/0072051 A1 | 4/2004 | Murata et al. | |
| 2006/0009372 A1 | 1/2006 | Mansfeld et al. | |
| 2011/0155616 A1* | 6/2011 | Eh | C10L 3/006 206/524.1 |

FOREIGN PATENT DOCUMENTS

DE    2337782 A1    2/1975

OTHER PUBLICATIONS

International Search Report and Written opinion received for PCT Application No.PCT/EP2016/075189, dated Dec. 21, 2016, 10 pages.

* cited by examiner

*Primary Examiner* — Kaity V Chandler

(57) ABSTRACT

An odorized methane comprising fluid has an odorant and a carrier. The odorant is ethyl acrylate and/or ethyl mercaptan. The carrier is propane, n-butane, iso-butane, or a mixture of two or more thereof. The odorized methane-comprising fluid may be prepared by adding the odorant and the carrier separately or pre-mixed to a methane comprising liquid or slush.

20 Claims, No Drawings

ODORIZED METHANE FLUID AND PROCESSES FOR PRODUCING ODORIZED METHANE FLUIDS AND THE USE THEREOF

CROSS REFERENCE TO RELATED APPLICATIONS

This is a national stage application of International application No. PCT/EP2016/075189, filed 20 Oct. 2016, which claims benefit of priority of European application No. 15191521.2, filed 26 Oct. 2015.

FIELD OF THE INVENTION

The invention relates to an odorized methane comprising fluid, and processes for producing odorized methane comprising fluids, and the use thereof. The invention especially relates to odorized LNG, processes for producing odorized LNG, and the use of odorized LNG.

BACKGROUND TO THE INVENTION

Methane comprising fluids can be derived from a number of sources, such as natural gas or petroleum reservoirs, aerobic or anaerobic digestion of biological material, or from a synthetic source such as a Fischer-Tropsch process.

Aerobic or anaerobic digestion of biological material can have many forms. It may, for example, concern aerobic or anaerobic digestion of dairy waste. Aerobic or anaerobic digestion of biological material results in a methane comprising fluid which may also be referred to as bio-methane, bio-gas or bio-fuel.

The Fischer-Tropsch process can be used for the conversion of synthesis gas (from hydrocarbonaceous feed stocks) into liquid and/or solid hydrocarbons. Generally, the feed stock (e.g. natural gas, associated gas and/or coal-bed methane, heavy and/or residual oil fractions, coal, biomass) is converted in a first step into a mixture of hydrogen and carbon monoxide (this mixture is often referred to as synthesis gas or syngas).

In this text the term natural gas is used to refer to methane comprising streams originating from any source.

The term methane comprising fluid is used in this text to refer to fluids comprising at least 40 m/m % methane. The term in particular relates to natural gas fluids. Similarly, the terms methane comprising gas, methane comprising liquid, and methane comprising slush of liquid and solids, refer to gas, liquid, and slush of liquid and solids comprising at least 40 m/m % methane. A methane comprising fluid may comprise up to 100 m/m % methane, especially up to 99.9 m/m % methane, it may comprise up to 99 m/m % methane, it may comprise up to 90 m/m % methane. In the context of this invention a slush of liquid and solids is considered a fluid. The term methane comprising gas in particular relates to natural gas. The terms methane comprising liquid, and methane comprising slush of liquid and solids, in particular relate to LNG.

Natural gas is a useful fuel source, as well as a source of various hydrocarbon compounds. It is often desirable to liquefy natural gas in a liquefied natural gas (LNG) plant at or near the source of a natural gas stream to enable compact storage of the natural gas and/or efficient transport of the natural gas over long distances. Natural gas can be more easily stored and transported in a liquid form than in a gaseous form because it occupies a smaller volume.

Liquefied natural gas plants are well known in the field and comprise the following processing steps:
   optionally treating the methane comprising stream by removing impurities in a treating stage, such as water, acid gases, mercury,
   optionally removing natural gas liquids from the methane comprising stream in a NGL stage, such as ethane, propane, butane and heavier components,
   cooling the methane comprising stream in one or more cooling stages, for instance a pre-cooling stage and a main cooling stage, and
   optionally flashing the methane comprising stream in an end-flash stage and,
   optionally, storing the liquefied natural gas in a storage tank.

Natural gas is odorless. It is known to odorize natural gas so that people can easily detect very low concentrations of natural gas in air.

When transporting, storing, or handling a methane comprising liquid or slush, normally boil off gas is created due to heat ingress. Thus, there is a need for an odorized methane comprising liquid or slush so that low concentrations of boil off gas in air can be easily detected by people.

Odorants for a methane comprising liquid or slush, however, need to fulfill a number of requirements. The odorant needs to have a good solubility in a methane comprising liquid or slush at very low temperatures, even at temperatures around −162° C., or even −185° C. Furthermore, the odorant needs to remain in the methane comprising fluid when it transfers from the liquid phase to the gas phase. Additionally, the odorant needs to have a sufficiently low odor threshold value.

SUMMARY OF THE INVENTION

The present invention relates to an odorized methane comprising liquid, and to an odorized methane comprising slush of liquid and solids. The invention especially relates to odorized LNG, whereby the LNG can be a liquid, or a slush of liquid and solids. The odorant is ethyl acrylate, ethyl mercaptan, or a mixture thereof. The carrier for the odorant is propane, n-butane, iso-butane, or a mixture of two or more thereof.

The present invention also relates to a process for preparing such an odorized liquid or slush by liquefying odorized methane comprising gas. The invention also relates to a process in which odorant is added to a methane comprising liquid or slush.

In more detail, the present invention relates to an odorized methane comprising fluid comprising:
   a methane comprising fluid,
   in the range of from 1 to 100 ppm of an odorant, and
   in the range of from 0.1 to 10 m/m % of a carrier, calculated on the total mass of the odorized methane comprising fluid;
whereby the carrier is propane, n-butane, iso-butane, or a mixture of two or more thereof, and
whereby the odorant is ethyl acrylate, ethyl mercaptan, or a mixture thereof, and
whereby the odorized methane comprising fluid is a liquid, or a slush of liquid and solids, and
whereby the odorized methane comprising fluid preferably is at a temperature in the range of from −62° C. to −185° C., and at a pressure in the range of from 20 mbara to 120 bara, preferably 250 mbara to 76 bara.

The present invention further relates to a process for preparing an odorized methane comprising fluid, in the range of from 1 to 100 ppm of an odorant, and in the range of from 0.1 to 10 m/m % of a carrier, the process comprising the following step:

a) adding odorant and carrier to a methane comprising liquid, or a methane comprising slush of liquid and solids, whereby the odorant and carrier are added separately and/or mixed, and
whereby the carrier is propane, n-butane, iso-butane, or a mixture of two or more thereof, and
whereby the odorant is ethyl acrylate, ethyl mercaptan, or a mixture thereof, and
whereby the liquid or slush comprising methane preferably is at a temperature in the range of from −62° C. to −185° C., and at a pressure in the range of from 20 mbara to 120 bara, preferably 250 mbara to 76 bara.

The present invention also relates to a process for preparing an odorized methane comprising fluid comprising in the range of from 1 to 100 ppm of an odorant, and in the range of from 0.1 to 10 m/m % of a carrier, the process comprising the following steps:

a) adding odorant and carrier to a methane comprising gas, whereby the odorant and carrier are added separately and/or mixed, and
whereby the carrier is propane, n-butane, iso-butane, or a mixture of two or more thereof, and
whereby the odorant is ethyl acrylate, ethyl mercaptan, or a mixture thereof, and
whereby the methane comprising gas preferably is at a temperature in the range of from −40 to +200° C., more preferably −25 to +85° C., and;
b) liquefying the mixture obtained in step a) to a temperature in the range of from −62° C. to −185° C. and a pressure in the range of from 20 mbara to 120 bara, preferably 250 mbara to 76 bara.

It was found that the odorized methane comprising liquid or slush of the invention shows a good solubility of the odorant at very low temperatures, especially at temperatures around −162° C., or even −185° C. Furthermore, boil off gas in air can be easily detected by people as the odorant has a sufficiently low odor threshold value, and the odorant proved to remain in the methane comprising fluid when it transferred from the liquid phase to the gas phase.

DETAILED DESCRIPTION OF THE INVENTION

The invention relates to an odorized methane comprising fluid, and processes for producing odorized methane comprising fluids, and the use thereof. The invention especially relates to odorized LNG, processes for producing odorized LNG, and the use of odorized LNG. The odorant, and optionally a tracer, may, for example, be added at natural gas production facilities, at an LNG terminal, or at a retail station. The odorant, and optionally a tracer, may be added to a methane comprising fluid before or after liquefaction.

Odorized Methane Comprising Liquid or Slush

The present invention relates to an odorized methane comprising liquid, and to an odorized methane comprising slush of liquid and solids. The invention especially relates to odorized LNG, whereby the LNG can be a liquid, or a slush of liquid and solids.

The present invention relates to an odorized methane comprising fluid comprising:
a methane comprising fluid,
in the range of from 1 to 100 ppm of an odorant, and
in the range of from 0.1 to 10 m/m % of a carrier, calculated on the total mass of the odorized methane comprising fluid. The carrier is propane, n-butane, iso-butane, or a mixture of two or more thereof. The odorant is ethyl acrylate, ethyl mercaptan, or a mixture thereof. The odorized methane comprising fluid is a liquid, or a slush of liquid and solids. The odorized methane comprising fluid preferably is at a temperature in the range of from −62° C. to −185° C., and at a pressure in the range of from 20 mbara to 120 bara, preferably 250 mbara to 76 bara.

Odorant and carrier preferably are used in a ratio of from 1:20 to 1:50000, more preferably 1:100 to 1:5000, even more preferably 1:650 to 1:1500.

Preferably the odorized methane comprising fluid comprises 2 to 10 ppm odorant, and preferably 0.2 to 1 m/m % carrier, calculated on the total mass of the odorized methane comprising fluid.

More preferably the odorized methane comprising fluid comprises 4 to 6 ppm odorant, and preferably 0.4 to 0.6 m/m % carrier, calculated on the total mass of the odorized methane comprising fluid.

Preferably the carrier is iso-butane.

Preferably the odorant is ethyl acrylate or a mixture of ethyl acrylate and ethyl mercaptan.

In a preferred embodiment the odorized methane comprising fluid according to the invention additionally comprises a tracer. A tracer compound may be used as a kind of fingerprint. It may, for example, be used to indicate the source of the methane comprising fluid. Alternatively, it may be used to indicate the purpose of the methane comprising fluid, for example for domestic use or for industrial use. The presence of a tracer in a methane comprising fluid may be determined by means of any suitable commonly used gas detector.

A highly suitable tracer is methyl acetate. Preferably the odorized methane comprising fluid comprises in the range of from 1 to 250 ppm, more preferably 1 to 100 ppm, even more preferably 1 to 50 ppm methyl acetate, calculated on the total mass of the odorized methane comprising fluid.

Process in which Odorant is Added to Liquid or Slush

The present invention also relates to a process in which odorant is added to a methane comprising liquid or slush. Preferably a labelled methane comprising liquid or slush according to the invention is obtained. All embodiments of the labelled methane comprising liquid or slush as described above can be obtained with this process.

The invention relates to a process for preparing an odorized methane comprising fluid, in the range of from 1 to 100 ppm of an odorant, and in the range of from 0.1 to 10 m/m % of a carrier. The process comprises the following step:

a) adding odorant and carrier to a methane comprising liquid, or a methane comprising slush of liquid and solids. The odorant and carrier are added separately and/or mixed. The carrier is propane, n-butane, iso-butane, or a mixture of two or more thereof. The odorant is ethyl acrylate, ethyl mercaptan, or a mixture thereof. The liquid or slush comprising methane preferably is at a temperature in the range of from −62° C. to −185° C., and at a pressure in the range of from 20 mbara to 120 bara, preferably 250 mbara to 76 bara.

Odorant and carrier preferably are used in a ratio of from 1:20 to 1:50000, more preferably 1:100 to 1:5000, even more preferably 1:650 to 1:1500.

Preferably the obtained odorized methane comprising fluid comprises 2 to 10 ppm odorant, and preferably 0.2 to 1 m/m % carrier, calculated on the total mass of the odorized methane comprising fluid.

Preferably the obtained odorized methane comprising fluid comprising fluid comprises 4 to 6 ppm odorant, and preferably 0.4 to 0.6 m/m % carrier, calculated on the total mass of the odorized methane comprising fluid.

Preferably the carrier is iso-butane.

Preferably odorant is ethyl acrylate or a mixture of ethyl acrylate and ethyl mercaptan.

Preferably step a) of the process is performed by:
a1) adding odorant to carrier, and
a2) adding at least a part of the mixture obtained in step a1) to a methane comprising liquid, or a methane comprising slush of liquid and solids.

In a preferred embodiment the process of the invention a tracer is added in addition to the odorant and the carrier. A highly suitable tracer is methyl acetate.

Preferably in the range of from 1 to 250 ppm, more preferably 1 to 100 ppm, even more preferably 1 to 50 ppm methyl acetate is added separately and/or mixed with odorant and/or carrier to a methane comprising liquid, or a methane comprising slush of liquid and solids.

Preferably a stream comprising odorant is added to a gas stream, a liquid stream, or a stream of a slush of liquid and solids, using a flow controller, e.g. a control valve, or an injection pump, e.g. a fixed volume injection pump, and a PLC (programmable logic controller).

Process in which Odorant is Added to Gas, Followed by Liquefaction

The present invention also relates to a process for preparing such an odorized liquid or slush by liquefying odorized methane comprising gas. Preferably a labelled methane comprising liquid or slush according to the invention is obtained. All embodiments of the labelled methane comprising liquid or slush as described above can be obtained with this process.

The invention relates to a process for preparing an odorized methane comprising fluid comprising in the range of from 1 to 100 ppm of an odorant, and in the range of from 0.1 to 10 m/m % of a carrier. The process comprises the following steps:
a) adding odorant and carrier to a methane comprising gas, whereby the odorant and carrier are added separately and/or mixed, and
whereby the carrier is propane, n-butane, iso-butane, or a mixture of two or more thereof, and
whereby the odorant is ethyl acrylate, ethyl mercaptan, or a mixture thereof, and
whereby the methane comprising gas preferably is at a temperature in the range of from −40 to +200° C., more preferably −25 to +85° C., and;
b) liquefying the mixture obtained in step a) to a temperature in the range of from −62° C. to −185° C. and a pressure in the range of from 20 mbara to 120 bara, preferably 250 mbara to 76 bara.

Odorant and carrier preferably are used in a ratio of from 1:20 to 1:50000, more preferably 1:100 to 1:5000, even more preferably 1:650 to 1:1500.

Preferably the obtained odorized methane comprising fluid comprises 2 to 10 ppm odorant, and preferably 0.2 to 1 m/m % carrier, calculated on the total mass of the odorized methane comprising fluid.

Preferably the obtained odorized methane comprising fluid comprising fluid comprises 4 to 6 ppm odorant, and preferably 0.4 to 0.6 m/m % carrier, calculated on the total mass of the odorized methane comprising fluid.

Preferably the carrier is iso-butane.

Preferably odorant is ethyl acrylate or a mixture of ethyl acrylate and ethyl mercaptan.

Preferably steps a) and b) of the process are performed by:
a1) adding odorant to carrier, and
a2) adding at least a part of the mixture obtained in step a1) to a methane comprising gas,
whereby the methane comprising gas preferably is at a temperature in the range of from −40 to +200° C., more preferably −25 to +85° C., and
b) liquefying the mixture obtained in step a2) to a temperature in the range of from −62° C. to −185° C. and a pressure in the range of from 20 mbara to 120 bara, preferably 250 mbara to 76 bara.

In a preferred embodiment the process of the invention a tracer is added in addition to the odorant and the carrier. A highly suitable tracer is methyl acetate.

Preferably in the range of from 1 to 250 ppm, preferably 1 to 100 ppm, more preferably 1 to 50 ppm methyl acetate is added separately and/or mixed with odorant and/or carrier to the methane comprising gas.

Preferably a stream comprising odorant is added to a gas stream, a liquid stream, or a stream of a slush of liquid and solids, using a flow controller, e.g. a control valve, or an injection pump, e.g. a fixed volume injection pump, and a PLC (programmable logic controller).

Use

The invention further relates to the use of an odorized methane comprising fluid according to the invention, or prepared in a process according to the invention, as fuel in automotive industry, marine industry, or for power generation.

EXAMPLES

Odorized LNG samples were prepared according to the invention. Natural gas was odorized, followed by liquefaction in a cryostat. The odorized natural gas was analyzed before and after liquefaction. Also comparative samples were prepared by using a different odorant, or by only adding a tracer.

The results are summarized in the following tables.

Sample Preparation:

| Sample | Odorant | Concentration added to natural gas [ppm] | Concentration in liquid phase after liquefaction [ppb] |
| --- | --- | --- | --- |
| A | Ethyl acrylate | 5 | 550 ± 12% RSD |
| B | Ethyl acrylate | 5 | 5000 ± 2.6% RSD |
| C | Methyl acrylate | 5 | 350 ± 8% RSD |
| D | Methyl acetate | 5 | 4000 ± 20% RSD |
| E | t-butyl mercaptan | 1 | 1000 ± 20% RSD |
| F | t-butyl mercaptan | 5 | 2063 ± 20% RSD |
| G | diethyl sulphide | 5 | 4550 ± 4% RSD |
| H | ethyl mercaptan | 1 | 969 ± 3.8% RSD |
| I | ethyl mercaptan | 5 | 4803 ± 4.6% RSD |
| J | dimethyl ether | 5000 | 500000 ± 17% RSD |

From the sample preparation follows that some odorants do not dissolve well at very low temperatures. They crystallize out.

Measurements were performed on the odorized natural gas before liquefaction. In other words, measurements were performed on odorized NG. The measurements were performed using a gas detector and by smelling.

Measurements on Odorized Natural Gas Using a Gas Cylinder:

| Sample | Amount of odorant (using gas detector) [ppm] | Odor at 20% LEL |
|---|---|---|
| A | 5 ± 0.3% RSD | Yes |
| B | 5 ± 0.1% RSD | Yes |
| C | 5 ± 0.2% RSD | No |
| D | 5 ± 0.3% RSD | No |
| E | 1 ± 0.8% RSD | Yes |
| F | 5 ± 0.3% RSD | Yes |
| G | 5 ± 0.1% RSD | Insufficient data |
| H | 1 ± 0.7% RSD | Yes |
| I | 5 ± 0.3% RSD | Yes |
| J | 4947 ± 0.1% RSD | No |

"20% LEL" stands for 20% of lower explosion limit.
"Odor at 20% LEL" stands for whether or not odor could be smelled at 20% LEL.
"RSD" stands for relative standard deviation.

Measurements were performed on the odorized natural gas which was liquefied in the cryostat. In other words, measurements were performed on odorized LNG. The measurements were performed using a gas detector and by smelling.

In the headspace of the cryostat none of the odorants was detected by either gas detection or smelling.

Measurements on Odorized LNG in Cryostat:

| Sample | Temperature of liquid [K] | Pressure [PSI] | Odor at 20% LEL |
|---|---|---|---|
| A | 114 | 18 | Yes |
| B | 124 | 35 | Yes |
| C | 114 | 18 | Yes |
| D | 114 | 18 | No |
| E | 114 | 18 | Yes |
| F | 114 | 18 | Yes |
| G | 114 | 18 | Insufficient data |
| H | 114 | 18 | Yes |
| I | 114 | 18 | Yes |
| J | 114 | 18 | No |

Measurements on Boil Off Gas of the Odorized LNG:

| Sample | Boil off gas (using gas detector) [ppb] | Odor at 20% LEL |
|---|---|---|
| A | 0 | Insufficient data |
| B |  | Yes |
| C |  | No |
| D | 100 ± 8 RSD | No |
| E |  | No |
| F |  | No |
| G |  | No |
| H |  | Insufficient data |
| I |  | Yes |
| J |  | No |

From the above data is clear that ethyl acrylate and ethyl mercaptan are suitable to be used as odorant for LNG. From the above data follows that methyl acetate is suitable to be used as tracer.

That which is claimed is:

1. An odorized methane comprising fluid comprising:
   a methane comprising fluid,
   an odorant in a range of from 1 to 100 ppm, and
   a carrier in a range of from 0.1 to 10 m/m %,
   calculated on the total mass of the odorized methane comprising fluid;
   whereby the carrier is propane, n-butane, iso-butane, or a mixture of two or more thereof, and
   whereby the odorant is ethyl acrylate, ethyl mercaptan, or a mixture thereof, and
   whereby the odorized methane comprising fluid is a liquid, or a slush of liquid and solids.

2. The odorized methane comprising fluid according to claim 1, whereby the odorized methane comprising fluid comprises 2 to 10 ppm odorant, calculated on the total mass of the odorized methane comprising fluid.

3. The odorized methane comprising fluid according to claim 2, whereby the odorized methane comprising fluid comprises 4 to 6 ppm odorant, calculated on the total mass of the odorized methane comprising fluid.

4. The odorized methane comprising fluid according to claim 1, whereby the carrier is iso-butane.

5. The odorized methane comprising fluid according to claim 1, whereby the odorant is ethyl acrylate or a mixture of ethyl acrylate and ethyl mercaptan.

6. The odorized methane comprising fluid according to claim 1, whereby the odorized methane comprising fluid additionally comprises methyl acetate in a range of from 1 to 250 ppm, calculated on the total mass of the odorized methane comprising fluid.

7. The odorized methane comprising fluid according to claim 1, wherein the odorized methane comprising fluid is at a temperature in the range of from −62° C. to −185° C., and at a pressure in the range of from 20 mbara to 120 bara.

8. The odorized methane comprising fluid according to claim 1, wherein the odorized methane comprising fluid is at a temperature in the range of from −62° C. to −185° C. and at a pressure of from 250 mbara to 76 bara.

9. A process for preparing an odorized methane comprising fluid, the process comprising the following step:
   a) adding an odorant in range of from 1 to 100 ppm and a carrier in a range of from 0.1 to 10 m/m % to a methane comprising liquid, or to a methane comprising slush of liquid and solids,
   whereby the odorant and carrier are added separately and/or mixed,
   whereby the carrier is propane, n-butane, iso-butane, or a mixture of two or more thereof, and
   whereby the odorant is ethyl acrylate, ethyl mercaptan, or a mixture thereof.

10. The process according to claim 9, comprising the following steps:
   a1) adding the odorant to the carrier, and
   a2) adding at least a part of the mixture obtained in step a1) to the methane comprising liquid, or to the methane comprising slush of liquid and solids.

11. The process according to claim 9, wherein methyl acetate in a range of from 1 to 250 ppm is added separately and/or mixed with the odorant and/or the carrier to the methane comprising liquid, or to the methane comprising slush of liquid and solids.

12. The process according to claim 9, wherein a stream comprising the odorant is added to a gas stream, a liquid stream, or a stream of a slush of liquid and solids, using a flow controller or an injection pump and a PLC (programmable logic controller).

13. The process according to claim 9, wherein the liquid or slush comprising methane is at a temperature in the range of from −62° C. to −185° C., and at a pressure in the range of from 20 mbara to 120 bara.

14. The process according to claim 9, wherein the liquid or slush comprising methane is at a temperature in the range of from −62° C. to −185° C., and at a pressure in the range of from 250 mbara to 76 bara.

15. A process for preparing an odorized methane comprising fluid, the process comprising the following steps:
   a) adding an odorant in a range of from 1 to 100 ppm and a carrier in a range of from 0.1 to 10 m/m % to a methane comprising gas,
   whereby the odorant and carrier are added separately and/or mixed,
   whereby the carrier is propane, n-butane, iso-butane, or a mixture of two or more thereof, and
   whereby the odorant is ethyl acrylate, ethyl mercaptan, or a mixture thereof, and
   whereby the methane comprising gas is at a temperature in a range of from −40 to +200° C., and;
   b) liquefying the mixture obtained in step a) to a temperature in a range of from −62° C. to −185° C. and a pressure in the range of from 20 mbara to 120 bara.

16. The process according to claim 15, comprising the following steps:
   a1) adding the odorant to the carrier,
   a2) adding at least a part of the mixture obtained in step a1) to the methane comprising gas, and
   b) liquefying the mixture obtained in step a2) to a temperature in the range of from −62° C. to −185° C. and a pressure in the range of from 20 mbara to 120 bara.

17. The process according to claim 15, wherein in the range of from 1 to 250 ppm methyl acetate is added to methane comprising gas by separately adding and/or by mixing with the odorant and/or the carrier.

18. The process according to claim 15, wherein the methane comprising gas is at a temperature in the range of from −25 to +85° C.

19. The process according to claim 15, wherein the pressure in step (b) is in a range from 250 mbara to 76 bara.

20. A fuel for automotive industry, marine industry, or for power generation, comprising an odorized methane comprising fluid according to claim 1.

* * * * *